(12) United States Patent
Dommaschk et al.

(10) Patent No.: US 8,462,530 B2
(45) Date of Patent: Jun. 11, 2013

(54) CONVERTER WITH SHORT-CIRCUIT CURRENT LIMITING

(75) Inventors: Mike Dommaschk, Guteborn (DE); Jörg Dorn, Buttenheim (DE); Ingo Euler, Erlangen (DE); Jörg Lang, Stadtsteinach (DE); Quoc-Buu Tu, Rosstal (DE); Klaus Würflinger, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 864 days.

(21) Appl. No.: 12/520,548

(22) PCT Filed: Dec. 21, 2006

(86) PCT No.: PCT/DE2006/002321
§ 371 (c)(1),
(2), (4) Date: Aug. 3, 2009

(87) PCT Pub. No.: WO2008/074273
PCT Pub. Date: Jun. 26, 2008

(65) Prior Publication Data
US 2010/0034001 A1  Feb. 11, 2010

(51) Int. Cl.
*H02M 7/5387* (2007.01)
(52) U.S. Cl.
USPC ........... 363/132; 363/53; 363/56.04; 363/127
(58) Field of Classification Search
USPC ................. 363/53, 56.03, 56.04, 70, 71, 127, 363/132
See application file for complete search history.

(56) References Cited

U.S. PATENT DOCUMENTS

| | | | |
|---|---|---|---|
| 5,663,858 A | 9/1997 | Etter | |
| 5,949,273 A | 9/1999 | Mourick et al. | |
| 6,271,708 B1 | 8/2001 | Hoshi et al. | |
| 2005/0141253 A1 | 6/2005 | Talja et al. | |
| 2006/0146508 A1 | 7/2006 | Renken | |
| 2010/0034001 A1* | 2/2010 | Dommaschk et al. | 363/127 |

FOREIGN PATENT DOCUMENTS

| | | |
|---|---|---|
| DE | 4435255 A1 | 4/1996 |
| DE | 19726765 A1 | 1/1999 |
| EP | 1646120 A2 | 4/2006 |
| JP | 7007958 A | 1/1995 |
| JP | 8116677 A | 5/1996 |
| JP | 11041909 A | 2/1999 |
| JP | 2000059189 A | 2/2000 |
| JP | 2002209391 A | 7/2002 |
| JP | 2003299366 A | 10/2003 |
| JP | 2005176576 A | 6/2005 |
| JP | 2006339222 A | 12/2006 |

* cited by examiner

*Primary Examiner* — Jeffrey Sterrett
(74) *Attorney, Agent, or Firm* — Laurence A. Greenberg; Werner H. Stemer; Ralph E. Locher

(57) ABSTRACT

A device for inverting an electric current has at least one phase module which has an alternating current connection and at least one direct current connection. Semiconductor valves having semiconductor modules are connected in series and are provided for switching the electric current between the alternating current connection and each direct current connection. At least one power storage device is provided for storing electrical power. In order to provide such a device, with which the adverse effects of a bridging short circuit are reliably and effectively reduced, it is proposed that each semiconductor module has semiconductor groups connected in parallel to each other, wherein each semiconductor group of the semiconductor module is connected via its own separate semiconductor current path to at least one of the power storage devices.

8 Claims, 4 Drawing Sheets

CONVERTER WITH SHORT-CIRCUIT CURRENT LIMITING

BACKGROUND OF THE INVENTION

Field of the Invention

The invention relates to a device for converting an electric current comprising at least one phase module having an AC voltage connection and at least one DC voltage connection wherein semiconductor valves which have semiconductor modules connected in series and serve for switching the electric current between the AC voltage connection and each DC voltage connection and at least one energy store for storing electrical energy are provided.

Such a device is already known from DE 43 30 381 A1, which describes two converters connected to one another on the DC voltage side, wherein semiconductor valves for switching an electric current are provided. The semiconductor valves comprise a series circuit of submodules, wherein each submodule has at least one semiconductor module comprising a turn-off power semiconductor and a freewheeling diode reverse-connected in parallel therewith. A central capacitor is provided in the DC voltage circuit. In the case of a power semiconductor not being turned off, for example in the case of a turn-off failure of the power semiconductor as a result of a fault, a bridge short circuit can arise in the branch of the disturbed power semiconductor, the intermediate capacitor or capacitors immediately being discharged by said bridge short circuit. This can lead to an arc in the converter and thus to the explosion of the entire converter. In order to avoid or at least to reduce the adverse effects of the explosion, DE 43 30 381 A1 describes a so-called reversible short-circuit current limiter arranged in series with the capacitor or capacitors of the DC voltage intermediate circuit. The reversible short-circuit current limiter has a PTC thermistor alongside varistors and ohmic resistances. The response time of the PTC thermistor or thermistors, that is to say the time which elapses until the increase in the resistance as a result of a rise in temperature brought about by the short-circuit current, is approximately 100 µs. On account of this long response time, however, destruction of the semiconductor modules cannot always reliably be avoided, since it may already occur after a shorter time duration.

BRIEF SUMMARY OF THE INVENTION

It is an object of the invention, therefore, to provide a device of the type mentioned in the introduction by means of which the adverse effects of a bridge short circuit can be effectively and reliably reduced.

The invention achieves this object by virtue of the fact that each semiconductor module has semiconductor groups connected in parallel with one another, wherein each semiconductor group of the semiconductor module is connected to at least one of the energy stores via a dedicated separate semiconductor group current path.

The invention is based on the insight that the effects of a bridge short circuit can be effectively suppressed by reducing the energy converted in the arc that arises. In the context of the invention, this can be brought about by virtue of the fact that an appreciable portion of the energy of the energy store is kept away from the defect site occurring in the short-circuit situation or care is at least taken to ensure that the same energy is converted in the arc over a relatively long period of time, with the result that the arc power is reduced. This can be brought about for example by increasing the ohmic resistance or by increasing the inductance of the short-circuit branch. The increase in the ohmic resistance and the inductance in the short-circuit branch is provided by the separate electrical linking of the energy store or stores to semiconductor groups. This is also advantageous because the commercially available semiconductor modules typically already have semiconductor groups connected in parallel. Said semiconductor groups of a semiconductor module have for example a common control line and can therefore be transferred only jointly by means of expedient control signals from an on-state position, in which a current flow via the power semiconductors or semiconductors is possible, into an off-state position, in which a current flow via the semiconductors is interrupted. A fault in the semiconductor module during turn-off is usually present only in one of the semiconductor groups of the semiconductor module. In the short-circuit situation, therefore, the short-circuit current is essentially initially carried only by one semiconductor group. As a result of each semiconductor group being electrically separately connected in sections to the energy store of the converter, despite a low-resistance and low-inductance busbar linking of the entire device during normal operation the resistance and the inductance are greater in the fault branch that arises since only a small conductor cross section is available for the high short-circuit current over a certain length of the short-circuit branch and the current path for the fault current has an increased inductance. The fault current is therefore reduced overall, with the power converted in the arc simultaneously being reduced. The semiconductor modules comprise the jointly drivable semiconductor groups. Furthermore, the semiconductor modules can also have the freewheeling diode connected in the opposite sense. A submodule comprises at least one semiconductor module.

Advantageously, at least each semiconductor group current path is composed of high-grade steel in sections. Through the use of high-grade steel instead of the copper usually used, the ohmic resistance is increased even further with an improved short-circuit current limiting as a consequence.

In accordance with a further configuration of the device according to the invention, each energy store comprises sub-energy stores connected in parallel with one another, wherein each sub-energy store is connected to a semiconductor group via a dedicated separate semiconductor group current path. In the art of energy transmission and distribution, energy stores, such as capacitors, often comprise a parallel circuit of different sub-energy stores, wherein the energy stores are connected to a pole of the DC voltage intermediate circuit via a plurality of connection terminals. In the context of the invention, the connection of the separate connections of the sub-energy stores is not arranged upstream of the semiconductor groups, but rather only downstream of the semiconductor groups. In the short-circuit situation, therefore, only one sub-energy store is discharged, which has a lower capacitance in comparison with the total of all the sub-energy stores and has therefore stored less energy. In the short-circuit situation, only a fraction of the energy of the energy stores acts on a defect site in the semiconductor module.

If it is necessary from a circuitry standpoint for the semiconductor group current paths already to be connected upstream of the semiconductor modules, then this can be done inductively, for example. Thus, the semiconductor group current paths are expediently connected to one another via balance impedances. The balance impedances are for example part of the submodule. In a departure from this, the balance impedances are provided as branch inductors in the converter. In this case, the energy stored in the energy stores that are not connected to the defect site is converted for the most part in the balance impedances. Said balance impedances usually serve for balancing the voltage respectively dropped across the energy stores.

The balance impedances expediently comprise resistances, inductances and/or a combination of resistances and inductances.

A central energy store is expediently provided, which is connected to the DC voltage connection. Voltage source converters comprising a central energy store have already been known and commercially available for a long time.

In a departure from this, however, the semiconductor valves can comprise a series circuit formed by submodules, wherein each submodule has at least one semiconductor module and an energy store. In accordance with this advantageous further development, the energy stores are distributed among the semiconductor modules, such that a so-called multilevel converter is provided.

Further advantages and configurations of the invention are the subject matter of the description of exemplary embodiments of the invention with reference to the figures in the drawing, wherein identical reference symbols refer to identically acting component parts and wherein

DESCRIPTION OF THE INVENTION

Figure 1:
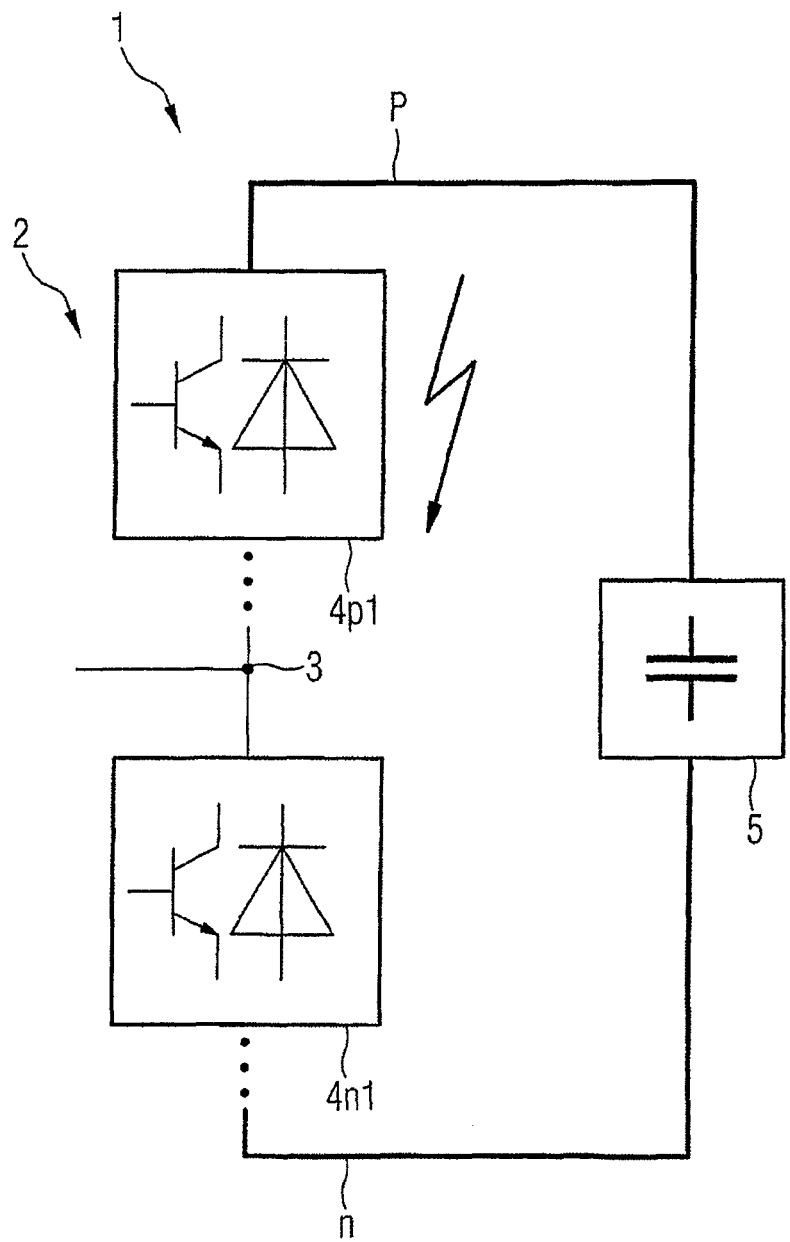
FIG. 1 shows an exemplary embodiment of a device in accordance with the prior art in schematic illustration.

FIG. 1 shows an exemplary embodiment of a device in accordance with the prior art. The converter 1 illustrated therein has a phase module 2 having two DC voltage connections p and n. Furthermore, an AC voltage connection 3 can be discerned, wherein a semiconductor valve $4p1$ extends between the AC voltage connection 3 and the DC voltage connection p and a further semiconductor valve $4n1$ extends between the negative DC voltage connection n and the AC voltage connection 3. Only one phase module 2 is illustrated in FIG. 1, for reasons of clarity. However, it should be pointed out that a phase module 2 is provided for each phase of the AC voltage power supply system connected to the converter 1, wherein all the phase modules 2 are constructed identically to the phase module shown in FIG. 1. A bridge circuit is generally realized by the semiconductor valves. Alongside the phase modules 2, the device 1 in accordance with FIG. 1 furthermore comprises a central energy store in the DC voltage circuit p, n, said central energy store being configured as a capacitor 5.

In the examples shown, each semiconductor valve $4p1$ comprises a series circuit of submodules, which here in each case have a semiconductor module comprising turn-off power semiconductors, wherein a freewheeling diode is reverse-connected in parallel with each turn-off power semiconductor, as is indicated by the circuit symbols in FIG. 1.

The number of semiconductor modules connected in series is dependent on the respectively prevailing voltages in the DC voltage circuit.

FIG. 1 indicates by the jagged arrow that a bridge short circuit has occurred. It is thus possible, for example, that one of the semiconductor modules can no longer be turned off and makes no contribution to the dielectric strength of the semiconductor valve $4p1$. The voltage between the AC voltage connection 3 and the DC voltage connection p is thus dropped across the remaining intact semiconductor modules. In the present case, the number of remaining intact semiconductor modules is unable to reliably block the voltage present. In other words, the AC voltage connection 3 is put at the potential of the positive DC voltage connection p. If the control of the converter transfers the semiconductor valve $4n1$ into its on-state position, a bridge short circuit occurs, with the result that the central capacitor 5 is immediately discharged. If bonded semiconductor modules are used, the bonding wires of the semiconductor module are vaporized, in which case an arc arises in which the capacitor energy is completely converted within a few microseconds. The semiconductor module consequently explodes with failure of the converter 1.

Figure 2:
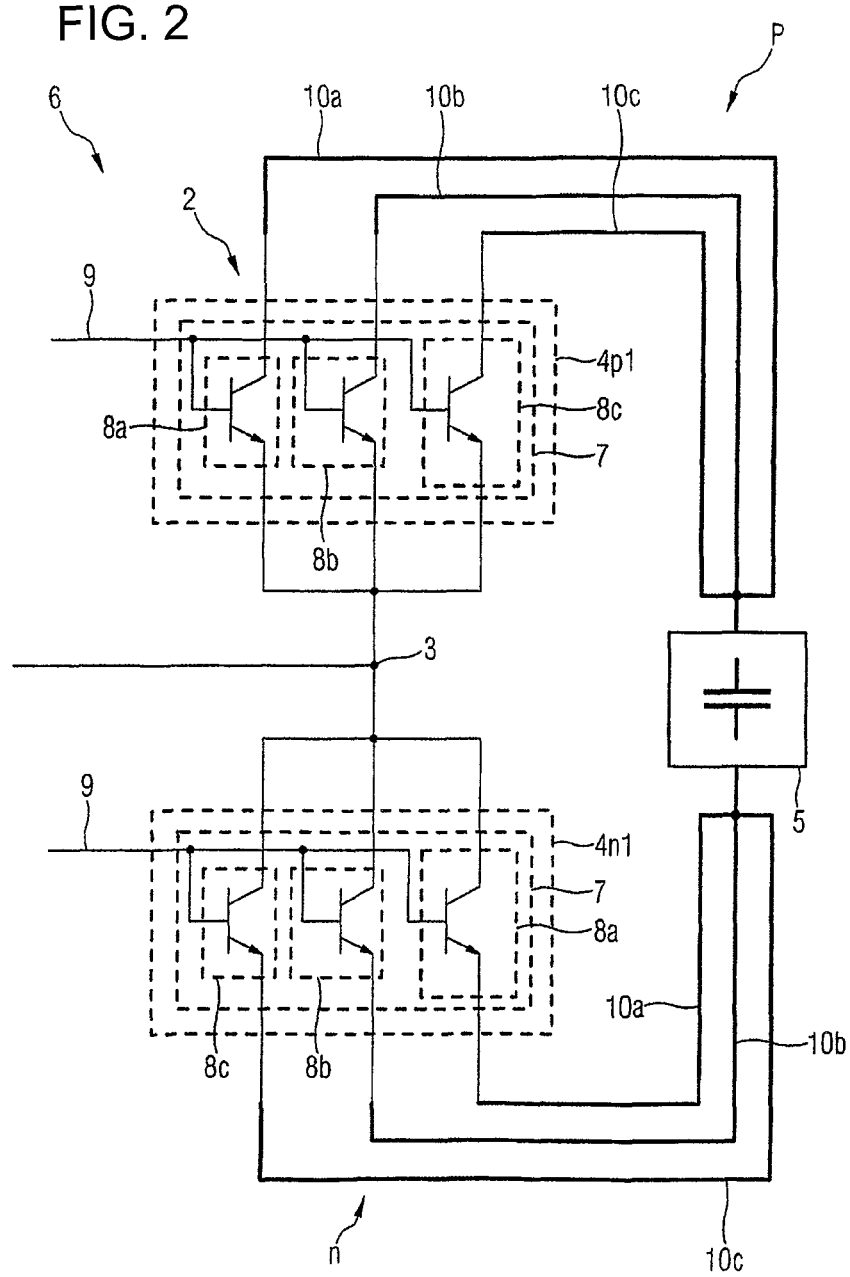
FIG. 2 shows an exemplary embodiment of the device according to the invention in schematic illustration.

FIG. 2 shows an exemplary embodiment of the device 6 according to the invention. It can be discerned that the semiconductor valve $4p1$ or respectively $4n1$ comprises semiconductor modules 7 connected in series with one another, although for reasons of clarity FIG. 2 illustrates only in each case one semiconductor module 7 per semiconductor valve $4p1$ or respectively $4n1$. It can furthermore be discerned that each semiconductor module 7 comprises three semiconductor groups $8a$, $8b$, $8c$ connected in parallel with one another, wherein the semiconductor groups $8a$, $8b$, $8c$ of a semiconductor module 7 can be transferred via a common control line 9 only jointly from an off-state position into an on-state position or respectively from an on-state position into their off-state position. The semiconductor groups $8a$, $8b$, $8c$ comprise turn-off power semiconductors, for example so-called GTOs, IGBTs or the like. A freewheeling diode (not illustrated pictorially in FIG. 2) is reverse-connected in parallel with each of said turn-off power semiconductors, as has already been indicated in FIG. 1. In contrast to the prior art illustrated in FIG. 1, the central energy store 5 is not connected via a single connecting line to the semiconductor modules 7 of the respective semiconductor valve $6p1$ or $6n1$. In the context of the invention, the central energy store 5 is connected via a plurality of separate semiconductor group current paths $10a$, $10b$ and $10c$ to a respective semiconductor group $8a$, $8b$ and $8c$, respectively. A fault generally occurs only in one semiconductor group $8a$, $8b$, $8c$. The short-circuit current is therefore constrained to flow only via one semiconductor group current path. In the case of a fault in the semiconductor group $8b$, the short-circuit current therefore flows via the semiconductor group current path $10b$. On account of the reduced conductor cross section in comparison with the total of all the semiconductor group current paths, an increase in the inductance and in the ohmic resistance occurs and a reduction of the energy and power converted in the arc thus occurs. The effects of an arc or of an explosion caused thereby are therefore attenuated according to the invention.

Figure 3:
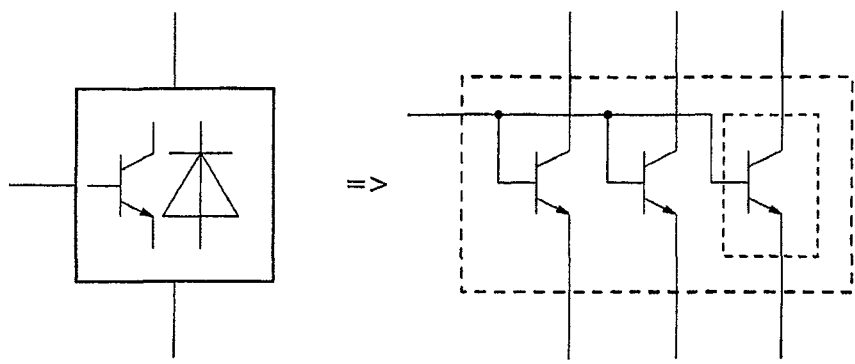
FIG. 3 shows a more detailed view of a semiconductor module.

FIG. 3 illustrates once again that the commercially available semiconductor modules usually comprise semiconductor groups which are connected in parallel and which are already equipped with separate connection terminals. The freewheeling diodes reverse-connected in parallel with the respective turn-off power semiconductors were not illustrated in the right-hand part of FIG. 3, for reasons of clarity.

Figure 4:
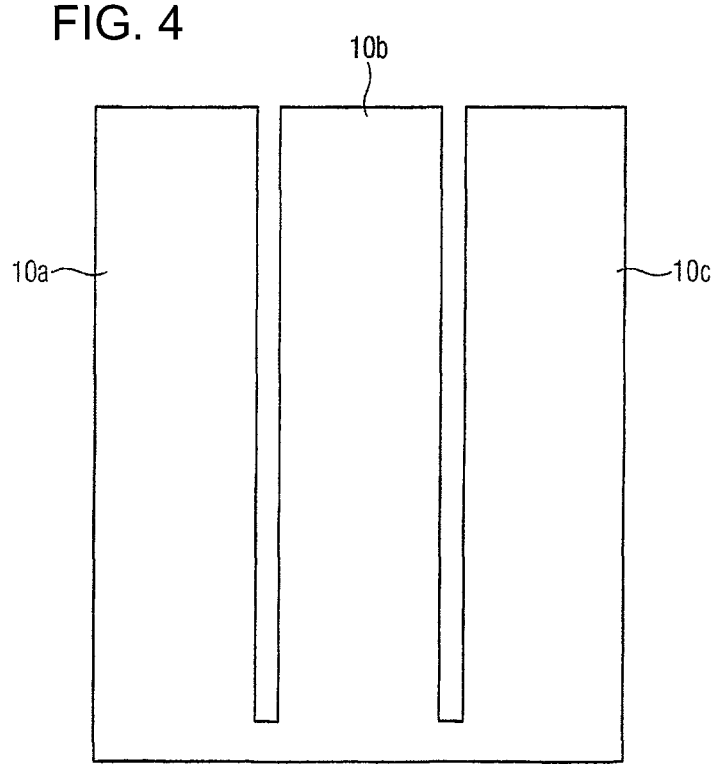
FIG. 4 shows an example for the busbar linking of the semiconductor module comprising semiconductor groups.

FIG. 4 shows a slotted connection plate used to realize the semiconductor group current paths 10a, 10b and 10c, by way of example.

Figure 5:
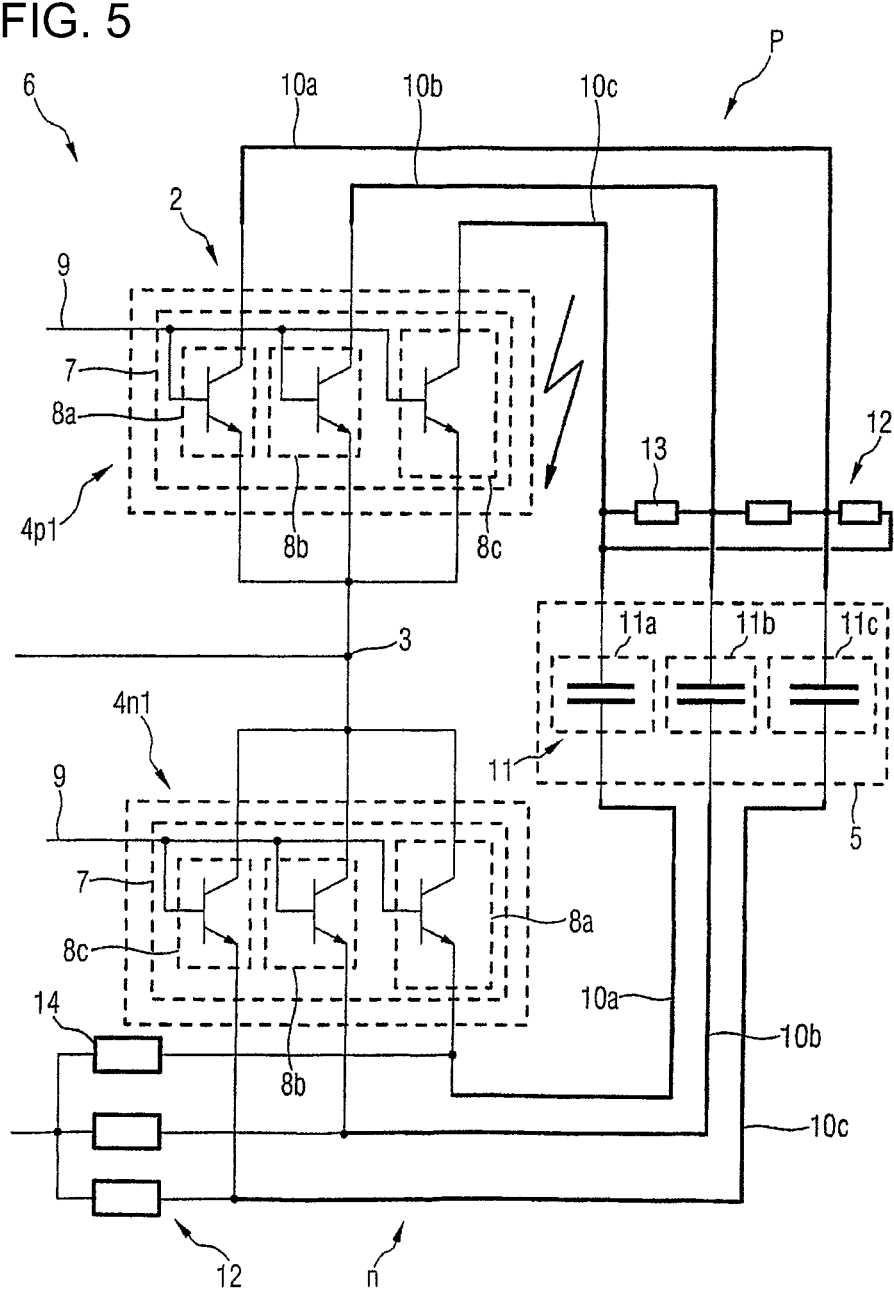
FIG. 5 shows a further exemplary embodiment of the invention with sub-energy stores.

FIG. 5 shows a further exemplary embodiment of the invention, wherein, however, the central energy store 5 comprises sub-energy stores 11a, 11b and 11c connected in parallel with one another. In this case, each sub-energy store 11a, 11b and 11c is connected to a semiconductor group 8a, 8b and 8c, respectively, via a separate semiconductor group current path 10a, 10b and 10c, respectively. If a fault occurs in the semiconductor group 8b, only the energy stored in the energy store 11b, but not the total energy of all the energy stores, is converted in the arc.

Balance impedances 12 are arranged between the semiconductor current paths. Said balance impedances 12 comprise ohmic resistances or inductances 13. Upon the discharge of a sub-energy store, for example of the sub-energy store 11b, on account of a short circuit of the semiconductor group 8c, the energy stored in the energy stores 11a and 11c is balanced by means of the balance impedances 12.

In a departure from the exemplary embodiments shown in FIGS. 2 and 5, it is also possible in the context of the invention to distribute the energy stores in the semiconductor valves. In this case, each semiconductor valve has a series circuit formed by submodules. In this case, each submodule has a sub-energy store alongside at least one semiconductor module. However, the series circuit of semiconductor modules within a semiconductor valve is maintained in the case of such so-called multilevel converters as well.

The invention claimed is:

1. A device for converting an electric current, the device comprising:
   at least one phase module having an AC voltage connection and at least one DC voltage connection;
   said phase module including semiconductor valves having semiconductor modules connected in series and serving for switching the electric current between said AC voltage connection and each said DC voltage connection, each of said semiconductor modules having semiconductor groups connected in parallel with one another;
   at least one energy store for storing electrical energy; and
   dedicated separate semiconductor group current paths connecting each of said semiconductor groups of said semiconductor module individually to said at least one energy store, said separate semiconductor group current paths directly connecting said semiconductor groups to said energy store without the imposition of additional inductors thus functioning as a low-inductance busbar link.

2. The device according to claim 1, wherein each of said semiconductor group current paths is composed of high-grade steel at least in sections.

3. The device according to claim 1, wherein each said energy store comprises sub-energy stores connected in parallel with one another, wherein each of said sub-energy stores is connected to one of said semiconductor groups via one of said dedicated separate semiconductor group current paths.

4. The device according to claim 3, further comprising balance impedances, said dedicated separate semiconductor group current paths are connected up to one another via said balance impedances.

5. The device according to claim 4, wherein said balance impedances have one of resistances, inductances and a combination of said resistances and said inductances.

6. The device according to claim 5, wherein said dedicated separate semiconductor group current paths are connected to one another via said inductances.

7. The device according to claim 1, wherein said at least one energy store is a central energy store connected to said at least one DC voltage connection.

8. The device according to claim 1, wherein said semiconductor valves contain a series circuit formed by submodules, wherein each of said submodules has at least one said semiconductor module and said energy store.

* * * * *